April 22, 1941.  C. E. OSTER  2,239,623
SLITTING MACHINE
Filed Feb. 19, 1941
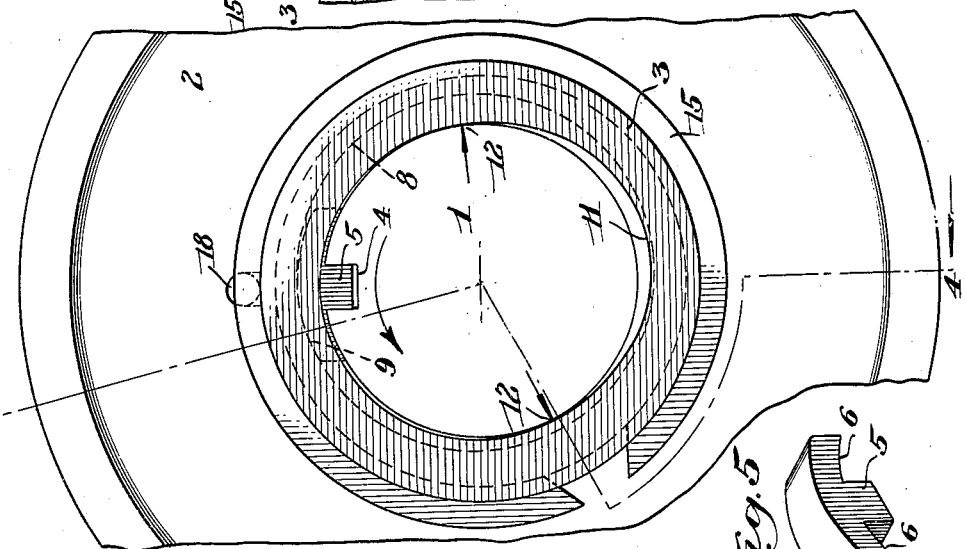
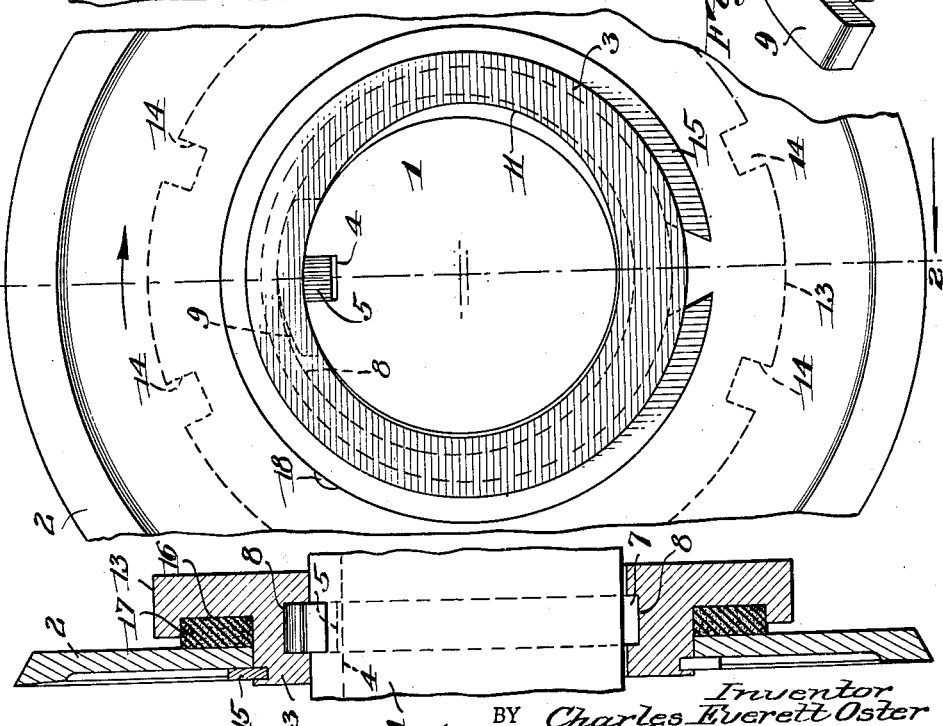
Inventor
Charles Everett Oster
BY Harold E. Stonebraker
his Attorney Patented Apr. 22, 1941

2,239,623

UNITED STATES PATENT OFFICE 2,239,623

SLITTING MACHINE

Charles Everett Oster, Rochester, N. Y.

Application February 19, 1941, Serial No. 379,663

14 Claims. (Cl. 164—70)

This invention relates to a slitting machine such as employed for cutting paper or other sheet material into strips of any desired width, and has for its object to afford a simple and practical construction that lends itself to a wider field of operations than possible heretofore.

The invention has to do with the type of machine involving parallel rotating spindles with coacting cutters mounted on the respective spindles, each pair of cutters being in contacting shearing relationship, and it has for a further purpose to provide means for readily securing a cutter at any adjusted position lengthwise of its supporting spindle.

Still a further purpose of the invention is to afford a structure in which a cutter is mounted on a clamping ring secured to a supporting spindle by means located between the spindle and clamping ring and confined within the opposite faces of the clamping ring, thus reducing to a minimum the space required on the spindle endwise thereof for securing a cutter, and making it possible to arrange coacting pairs of cutters in closer relationship than heretofore, so that strips of material of any desired narrow width can be cut, as narrow as a quarter of an inch if desired and limited only by the thickness of the clamping ring and cutter, which has not been possible with prior constructions owing to the space requirements on the spindle of the cutter fastening devices.

Another object of the invention is to afford a wedging cam locking means for securing the clamping ring on a supporting spindle, whereby the clamping ring can be quickly secured to or removed from the supporting spindle as requirements demand, and which firmly maintains the clamping ring and cutter in place without danger of accidental loosening.

An additional purpose of the invention is to afford a construction that insures attaching each cutter in a truly concentric and right angular relationship on its supporting spindle by gripping the spindle at approximately three equidistant points circumferentially, and at three spaced points endwise, that is two spaced points on one side of the spindle and a single point therebetween on the opposite side of the spindle.

In a more specific aspect, the invention has for its purpose to afford a clamping ring that is movable transversely of the supporting spindle to a slight extent for clamping engagement therewith, such action being effected by a wedging cam locking member that is adjustable endwise of the spindle and interlocked therewith against relative rotative movement while engaging an annular guideway surrounding the spindle in the clamping ring and having an eccentric outer wall that is engaged by the locking member to effect the necessary transverse movement of the clamping ring as the latter is rotated relatively to the supporting spindle to clamp the ring and cutter on the spindle.

To these and other ends, the invention consists in the construction and arrangement of parts that will appear clearly from the following description when read in conjunction with the accompanying drawing, the novel features being pointed out in the claims following the specification.

In the drawing:

Fig. 1 is an enlarged end elevation, partially broken away, of a preferred embodiment of the invention, showing a cutter and clamping ring on a supporting spindle in released position, the wedging cam locking member being at the deepest portion of the guideway in the clamping ring;

Fig. 2 is a sectional view on the line 2—2 of Fig. 1;

Fig. 3 is a view similar to Fig. 1, showing the position of the parts when the clamping ring has been turned relatively to the spindle to bring a shallower portion of the guideway into engagement with the locking member, the latter having thus wedged between the spindle and clamping ring and moved the clamping ring transversely of the spindle to effect the necessary clamping action;

Fig. 4 is a sectional view on the line 4—4 of Fig. 3, and

Fig. 5 is a perspective view of the wedging cam locking member.

Referring more particularly to the drawing, in which like reference numerals refer to the same parts throughout the several views, 1 designates the supporting spindle of a conventional slitting machine, it being understood that the spindle is rotated in any convenient manner to rotate its cutter in contact with a coacting rotating cutter on a parallel spindle, the parts being old and unnecessary to show here. The spindle 1 is provided with a cutter 2 mounted on a clamping ring 3, which is secured to the spindle 1 in the manner that will now be described in detail.

The spindle 1 is provided with a keyway 4 extending longitudinally thereof, and the clamping ring is held on the spindle by means of a wedging cam locking member that includes an inwardly extending projection 5 engaging said keyway 4 and preventing relative turning of the locking member and spindle. 6 designate wedge portions of the locking member on opposite sides of the inwardly extending projection 5 and conforming on their inner surfaces to the periphery of the spindle.

The wedging cam locking member just referred to is seated in and engages the annular guideway 7 formed in the clamping ring surrounding the spindle and provided with an outer wall 8 that is eccentrically arranged relatively to the clamping ring and spindle so that as the clamping ring is turned relatively to the spindle and wedging cam locking member, the eccentric relation of the outer wall 8 of the guideway 7 causes the clamping ring to be moved slightly in a transverse direction relatively to the spindle.

The locking member includes an outer cam surface 9 having a curvature eccentric to the spindle and clamping ring, affording outer surfaces on the wedge portions that are free from the outer wall of the guideway when in released position. When the clamping ring is turned on the spindle, one of the wedge portions occupies a position such that it fills the space between the spindle and the outer surface of the eccentric guideway 7, the outer surface of the wedge portion contacting the adjacent surface of the guideway, and finally wedging tightly therebetween to hold the clamping ring tightly on the spindle. At the same time, the wedging of the locking member against the eccentric wall 8 of the guideway in the clamping ring effects a transverse movement of the clamping ring and draws it tightly against the spindle at one side thereof. At one side, the clamping ring grips the spindle at two points spaced endwise thereof, due to the guideway formed in the clamping ring, see Fig. 4, which causes the spindle to be engaged by the portions of the clamping ring on opposite sides of the guideway, the distance between these points of contact being determined by the width of the guideway 7. On its opposite side, the spindle is gripped at a point endwise thereof between the aforementioned spaced contact points, such single point engagement being established by the wedging cam locking member between the spindle and clamping ring, as indicated by dotted lines in Fig. 4.

This arrangement enables securing the cutter and clamping ring firmly and rigidly on the spindle, and effectually prevents any wobbling or rocking of the clamping ring endwise of the spindle, thus making it possible to cut very narrow strips, since the distance between adjacent cutters on a spindle is limited by the width of the clamping ring.

In order to insure accurate positioning of a cutter on its spindle in truly concentric relation, it is desirable to effect engagement between the clamping ring and the spindle at approximately three circumferentially equidistant points around the spindle, and this is accomplished in the following manner.

The clamping ring is provided with an opening through which the supporting spindle extends, the major part of said opening being on a circular arc parallel to and slightly larger than the periphery of the spindle. In order to afford the desired three-point contact with the spindle, said circular opening is further cut away or recessed on a smaller eccentric arc as indicated at 11, to afford a surface on the clamping ring adjacent to the spindle that is slightly spaced from the spindle when in clamping position. The cut-away portion 11 is so located on the clamping ring that when the latter is in clamping position, the said cut-away portion 11 is approximately opposite to the wedging portion of the locking member that is then in wedging or locking position, and when in such clamping position, the spindle is gripped by the wedging cam locking member at one point circumferentially and the clamping ring is thereby forced against the spindle at the two points 12 which are about equidistantly located circumferentially of the spindle with relation to the point of engagement of the wedging cam locking member. The relation of the cut-away portion 11 and the three points of contact are such that when in the final clamping position, the cutter is concentrically mounted on the spindle.

The clamping ring includes an outer peripheral portion 13 provided with notches 14 to receive a spanner wrench or suitable tool for turning the clamping ring on the spindle to tighten or release the cutter. The clamping ring also includes a reduced bearing portion that receives the cutter, the latter being held in place on the bearing portion and against the peripheral portion 13 by means of a split locking ring 15 that fits into a suitable recess provided in the clamping ring and holds the cutter tightly thereon.

In order to insure accurate positioning of two contacting cutters and proper cooperation between them, one cutter of each pair is usually mounted rigidly while the other cutter of the pair is mounted to afford a slightly yielding engagement with the first mentioned cutter. To accomplish such yielding mounting of a cutter in the present structure, the clamping ring is provided with an annular cut-out portion or seat 16 on its inner face adjacent to the cutter, and arranged in said seat is a resilient annular ring 17 preferably made of sponge rubber, and affording a yieldable backing or support against which the cutter abuts and is held by the split locking ring 15. For the other cutter which is held rigidly, the sponge rubber body 17 is omitted, and the cutter is held by the split ring 15 rigidly against the peripheral portion 16. 18 designates a friction pin extending through openings in the clamping ring and cutter and acting to prevent relative turning between them.

With a construction like that described, assuming the clamping ring and cutter are loose on the spindle as in Figs. 1 and 2, the clamping ring with its cutter may be adjusted endwise to any desired position on the spindle, and to tighten the cutter and clamping ring, the latter is turned clockwise with reference to Fig. 1, in a direction opposite to the cutting movement of the spindle when the mechanism is in operation. Such turning of the clamping ring on the spindle causes a shallower portion of its eccentric guideway to contact the wedging cam locking member and thus effects a slight movement of the clamping ring upwardly with reference to Fig. 1 until the parts assume the position illustrated in Figs. 3 and 4. In this position, one end or wedge portion of the locking member is tightly wedged between the spindle and clamping ring, the clamping ring being then rigidly held against the spindle, in which position it will remain, due to the wedging action of the locking member, until the clamping ring is forcibly turned in the opposite direction with reference to the supporting spindle to release the parts. It is necessary to employ a suitable tool to loosen the clamping ring in this fashion, and when this is accomplished, the clamping ring and its cutter can be moved to any other selected position on the spindle and quickly tightened.

This structure maintains the clamping ring rigidly against any tendency to rock or wobble endwise and in a truly concentric relation on its supporting spindle due to the three-point circumferential contact between the spindle and clamping ring and also the three-point endwise contact between them. It also enables quick adjustment of a cutter and makes it possible to locate adjacent pairs of cutters in closer relationship than heretofore, permitting the cutting of narrow strips limited only by the width of the clamping ring since the wedging cam locking member is located entirely between the opposite faces of the clamping ring.

While the invention has been described with reference to the particular embodiment shown, it is not confined to the detail construction herein illustrated, and this application is intended to cover such departures or modifications as may come within the intended purposes of the improvement or the scope of the following claims.

I claim:

1. The combination with a rotatable spindle, of a clamping ring adjustable endwise on said spindle, a cutter mounted on the clamping ring, and a wedging cam locking member located between and engaging the spindle and clamping ring and acting to move the clamping ring transversely of the spindle when the clamping ring is turned relatively thereto, said locking member being held against turning movement on the spindle.

2. The combination with a rotatable spindle, of a clamping ring adjustable endwise on said spindle, a cutter mounted on the clamping ring, and a wedging cam locking member located between and engaging the spindle and clamping ring and acting to move the clamping ring transversely of the spindle when the clamping ring is turned relatively thereto, the clamping ring having an annular guideway surrounding the spindle with an eccentrically disposed outer wall that engages said locking member to effect wedging thereof and transverse shifting of the clamping ring when the latter is turned on the spindle.

3. The combination with a rotatable spindle, of a clamping ring adjustable endwise on said spindle, a cutter mounted on the clamping ring, the spindle having a longitudinally extending keyway, and a wedging cam locking member having an inwardly projecting portion engaging said keyway, the clamping ring having an annular guideway surrounding the spindle with an eccentrically disposed outer wall, and said locking member projecting into said guideway and having an outer cam surface that engages the eccentrically disposed outer wall of the guideway and is wedged thereagainst to effect transverse movement of the clamping ring when the latter is turned on the spindle.

4. The combination with a rotatable spindle, of a clamping ring adjustable endwise on said spindle, a cutter mounted on the clamping ring, the spindle having a longitudinally extending keyway, and a wedging cam locking member having an inwardly projecting portion engaging said keyway, said locking members conforming to the periphery of the spindle and extending on opposite sides of said keyway, the clamping ring having an annular guideway surrounding the spindle with an eccentrically disposed outer wall, and said locking member projecting into said guideway and having an outer cam surface that engages said eccentric outer wall and is wedged thereagainst to effect transverse movement of the clamping ring when the latter is turned on the spindle.

5. The combination with a rotatable spindle, of a clamping ring adjustable endwise on said spindle, a cutter mounted on the clamping ring, the spindle having a longitudinally extending keyway, and a wedging cam locking member having an inwardly projecting portion engaging said keyway, the clamping ring having an opening permitting it to fit loosely on the spindle and an annular guideway surrounding the spindle with an eccentrically disposed outer wall, and the locking member projecting into said guideway and having an outer cam surface that engages said outer wall of the guideway and is wedged thereagainst to effect transverse movement of the clamping ring when the latter is turned on the spindle, the clamping ring having an eccentrically curved cut-away portion at one side of the opening surrounding the spindle, said cut-away portion being located substantially opposite to the wedged portion of the locking member when the parts are in clamping position and acting to afford clamping of the spindle at approximately three points equidistant around the spindle.

6. The combination with a rotatable spindle, of a clamping ring adjustable endwise on said spindle, a cutter mounted on the clamping ring, and a wedging cam locking member slidable endwise of the spindle and held against relative turning thereon, the clamping ring being engaged with said wedging cam locking member to permit relative turning and having an eccentrically disposed annular guideway around the spindle in which said locking member is seated, said locking member acting to effect transverse movement of the clamping ring and to wedge between the spindle and clamping ring when the latter is turned on the spindle.

7. The combination with a rotatable spindle, of a clamping ring adjustable endwise on said spindle, a cutter mounted on the clamping ring, and a wedging cam locking member slidable endwise of the spindle and held against relative turning thereon, the clamping ring being engaged with said wedging cam locking member to permit relative turning and having an eccentrically disposed annular guideway around the spindle in which said locking member is seated, said locking member acting to effect transverse movement of the clamping ring and to wedge between the spindle and clamping ring when the latter is turned on the spindle, the clamping ring having an eccentrically arranged cut-away portion at one side of the opening surrounding the spindle and located opposite to the wedged portion of said locking member when the parts are in clamping position, said cut-away portion affording two points of engagement between the clamping ring and spindle at approximately equal distances from the wedged portion of the locking cam member.

8. The combination with a rotatable spindle, of a clamping ring adjustable endwise on said spindle, a cutter mounted on the clamping ring, the spindle having a longitudinally extending keyway and a clamping ring having an annularly extending guideway surrounding the spindle and eccentrically disposed with reference to the spindle, and a wedging cam locking member having an inwardly extending portion engaging said keyway in the spindle and a cam portion engaging said guideway in the clamping ring and acting to wedge between the spindle and clamping ring and to move the clamping ring transversely of the spindle when turned thereon.

9. The combination with a rotatable spindle, of a clamping ring adjustable endwise on said spindle, said clamping ring having an annular seat, an annular body of resilient material located in said seat, and means acting to hold a cutter against said annular body of resilient material, the spindle having a longitudinally extending keyway and a wedging cam locking member having an inwardly extending portion engaging said keyway, the clamping ring having an annular guideway surrounding the spindle and provided with an eccentrically disposed outer wall, and an outer cam surface on the locking member engaging said outer wall of the guideway in the clamping ring.

10. The combination with a rotatable spindle, of a clamping ring adjustable endwise on said spindle, said clamping ring having an annular seat, an annular sponge rubber body located in said seat, a cutter mounted on the clamping ring, a split locking ring engaging the cutter and clamping ring and acting to hold the cutter against said resilient body, the spindle having a longitudinally extending keyway and the clamping ring having an annular guideway surrounding the spindle and provided with an eccentrically arranged outer wall, and a wedging cam locking member having an inwardly extending portion engaging said keyway in the spindle, said locking member projecting into the guideway in the clamping ring and having a cam surface engaging said eccentric wall and acting to wedge between the spindle and clamping ring and move the clamping ring transversely of the spindle when turned thereon.

11. The combination with a rotatable spindle, of a clamping ring adjustable endwise on said spindle, a cutter mounted on the clamping ring, and a locking member located between and engaging the spindle and clamping ring and acting to move the clamping ring transversely of the spindle when the clamping ring is turned relatively thereto, the clamping ring having an annular guideway surrounding the spindle with an eccentrically disposed outer wall that engages said locking member, the spindle being gripped by the clamping ring at two points spaced endwise a distance determined by the width of said guideway and by the locking member at a single point opposite to said two points and located between them endwise of the spindle.

12. The combination with a rotatable spindle, of a clamping ring adjustable endwise on said spindle, a cutter mounted on the clamping ring, the spindle having a longitudinally extending keyway, and a wedging cam locking member having an inwardly projecting portion engaging said keyway, said locking member conforming to the periphery of the spindle and extending on opposite sides of said keyway, the clamping ring having an annular guideway surrounding the spindle with an eccentrically disposed outer wall, and said locking member projecting into said guideway and including opposite cam portions one of which engages said eccentric outer wall and is wedged thereagainst to effect transverse movement of the clamping ring when the latter is turned on the spindle, the spindle being gripped by the clamping ring at two points spaced endwise a distance determined by the width of said guideway and by the locking member at a single point opposite to said two points and located between them endwise of the spindle.

13. The combination with a rotatable spindle, of a clamping ring adjustable endwise on said spindle, a cutter mounted on the clamping ring, the spindle having a longitudinally extending keyway, and a wedging cam locking member having an inwardly projecting portion engaging said keyway, the clamping ring having an opening permitting it to fit loosely on the spindle and an annular guideway surrounding the spindle with an eccentrically disposed outer wall, and the locking member projecting into said guideway and having an outer cam surface that engages said outer wall of the guideway and is wedged thereagainst to effect transverse movement of the clamping ring when the latter is turned on the spindle, the clamping ring having an eccentrically curved cut-away portion at one side of the opening surrounding the spindle, said cut-away portion being located substantially opposite to the wedged portion of the locking member when the parts are in clamping position and acting to afford clamping of the spindle at approximately three points equidistant around the spindle, the spindle being gripped by the clamping ring at two points spaced endwise a distance determined by the width of said guideway and by the locking member at a single point opposite to said two points and located between them endwise of the spindle.

14. The combination with a rotatable spindle, of a clamping ring adjustable endwise on said spindle, a cutter mounted on the clamping ring, and a wedging cam locking member slidable endwise of the spindle and held against relative turning thereon, the clamping ring being engaged with said wedging cam locking member to permit relative turning and having an eccentrically disposed annular guideway around the spindle in which said locking member is seated, said locking member acting to effect transverse movement of the clamping ring and to wedge between the spindle and clamping ring when the latter is turned on the spindle, the clamping ring having an eccentrically arranged cut-away portion at one side of the opening surrounding the spindle and located opposite to the wedged portion of said locking member when the parts are in clamping position, said cut-away portion affording two points of engagement between the clamping ring and spindle at approximately equal distances from the wedged portion of the locking cam member, the spindle being gripped by the clamping ring at two points spaced endwise a distance determined by the width of said guideway and by the locking member at a single point opposite to said two points and located between them endwise of the spindle.

CHARLES EVERETT OSTER.